US006494039B2

(12) United States Patent
Pratt et al.

(10) Patent No.: US 6,494,039 B2
(45) Date of Patent: Dec. 17, 2002

(54) FORCE-CONTROLLED HYDRO-ELASTIC ACTUATOR

(75) Inventors: Gill A. Pratt, Lexington, MA (US); David W. Robinson, Manchester, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 6 days.

(21) Appl. No.: 09/797,389

(22) Filed: Feb. 28, 2001

(65) Prior Publication Data

US 2001/0054351 A1 Dec. 27, 2001

Related U.S. Application Data

(60) Provisional application No. 60/186,048, filed on Mar. 1, 2000.

(51) Int. Cl.[7] .............................. F16J 1/10; F16D 31/00

(52) U.S. Cl. .............................. 60/368; 60/393; 60/434; 92/84

(58) Field of Search .......................... 60/368, 393, 434; 92/84

(56) References Cited

U.S. PATENT DOCUMENTS

| | | | | | |
|---|---|---|---|---|---|
| 3,438,306 A | * | 4/1969 | Kazmarek | ...................... | 92/84 |
| 3,877,226 A | | 4/1975 | Blum | | |
| 4,420,936 A | * | 12/1983 | Matsui | ........................ | 60/434 |
| 4,765,225 A | | 8/1988 | Birchard | | |
| 4,954,005 A | | 9/1990 | Knasel et al. | | |
| 5,012,722 A | * | 5/1991 | McCormick | ................. | 91/433 |
| 5,650,704 A | | 7/1997 | Pratt et al. | | |

FOREIGN PATENT DOCUMENTS

EP 0 373 095 A1 6/1990

OTHER PUBLICATIONS

Kleidon, "Modeling and Performance of a Pneumatic/Hydraulic Hybrid Actuator With Tunable Mechanical Impedance," M.S. Thesis Massachusetts Institute of Technology, Cambridge, MA, Sep. 1983.

Jacobsen et al., "High Performance , High Dexterity, Force Reflective Teleoperator," Proceedings, *18th Conf. On Remote Systems Technology*, vol. 2, pp. 180–185, Nov. 1990.

Wells et al., "An Investigation of Hydraulic Actuator Performance Trade–offs Using a Generic Model," IEEE *Int. Conf. On Robotics and Automation*, pp. 2168–2173, May 1990.

Pratt et al., "Series Elastic Actuators," Proceedings, 1995 IEEE/RSJ *Int. Conf. On Intelligent Robots and Systems*, vol. 1, pp. 399–406, Aug., 1995.

(List continued on next page.)

*Primary Examiner*—F. Daniel Lopez
(74) *Attorney, Agent, or Firm*—Theresa A. Lober

(57) ABSTRACT

Provided is a force-controlled hydro-elastic actuator, including a hydraulic actuator, having a connection to hydraulic fluid and including a mechanical displacement member positioned to be mechanically displaced by fluid flow at the actuator. A valve is connected at the hydraulic actuator connection and has a port for input and output of fluid to and from the valve. At least one elastic element is provided in series with the mechanical displacement member of the hydraulic actuator and is positioned to deliver, to a load, force generated by the hydraulic actuator. A transducer is positioned to measure a physical parameter indicative of the force delivered by the elastic element and to generate a corresponding transducer signal. A force controller is connected between the transducer and the valve to control the valve, based on the transducer signal, for correspondingly actuating the hydraulic actuator and deflecting the elastic element.

28 Claims, 8 Drawing Sheets

OTHER PUBLICATIONS

Alleyne, "Nonlinear Force Control of an Electro–Hydraulic Actuator," ASME *Japan/USA Symposium on Flexible Automation,* vol. 1, pp. 193–200,1996.

Shim et al., "A New Probing System for the In–Circuit Test of a PCB," Proceedings, *1996 Int Conf. On Robotics and Automation*, vol. 1, Conf. 13, pp. 590–595, Apr. 1996.

Robinson et al., "Series Elastic Actuator Development for a Biomimetic Walking Robot," 1999 IEEE/ASME *Int. Conf. On Adv. Intelligent Mechatronics*, pp. 561–568, Sep. 1999.

Robinson et al., "Force Controllable Hydro–Elastic Actuator," *ICRA 2000*, San Francisco, CA, Apr. 2000.

Robinson, "Design and Analysis of Series Elasticity in Closed–Loop Actuator Force Control," Ph.D. thesis, Massachusetts Institute of Technology, Cambridge , MA, Jun. 2000.

Pratt, "Legged Robots at MIT: What's New Since Raibert," IEEE *Robotics and Automation Magazine,* vol. 7, No. 3, pp. 15–19, Sep. 2000.

* cited by examiner

FORCE-CONTROLLED HYDRO-ELASTIC ACTUATOR

This application claims the benefit of U.S. Provisional Application No. 60/186,048, filed Mar. 1, 2000.

BACKGROUND OF THE INVENTION

This invention relates to hydraulic actuators for use in, e.g., robotic applications, and more particularly relates to force control of hydraulic actuators.

An actuator is generally defined as a device or mechanism that converts some form of energy into mechanical force or torque and linear or rotary velocity. A hydraulic actuator typically is connected to a high pressure fluid source and a flow control valve, e.g., a spool valve. Application of a small signal to the valve deflects the valve, allowing the fluid to flow, e.g., into one or more chambers driving a mechanical mechanism such as a piston provided in one or more of the chambers. With this action, the hydraulic actuator converts fluid flow into mechanical piston velocity, and provides the ability to control this velocity and corresponding mechanical position.

Hydraulic actuators are particularly well-suited for velocity and position control of robots and heavy equipment. Hydraulic systems also are generally characterized by the highest power density of modern controllable actuation systems because they are often operated at a pressure of as much as 3000 psi or greater. Hydraulic systems can also support large loads indefinitely while consuming minimal power. Given these attributes, hydraulic actuation systems are frequently the optimum choice for high force, high power density motion control applications such as automobile steering systems, airplane control surfaces, and heavy equipment operations employing, e.g., construction machinery.

While hydraulic systems are in many respects optimal for velocity and position control, a number of inherent hydraulic system limitations constrain their applicability for force control. For most applications, force control requires an ability to sense and correspondingly control the forces of interaction between an actuator and the actuation environment. But in hydraulic systems, a measurement of the primary system variable, hydraulic pressure, does not fully enable such. Specifically, the pressure in a hydraulic chamber, e.g., a piston chamber, is not in general a good representation of the force at the actuator output. Hydraulic systems are in general very sensitive to contamination, such as foreign particles, in the hydraulic fluid. In order to limit such contamination, it is preferable to employ tight fluidic seals at the hydraulic piston and cylinder. Tight seals are found, however, to typically produce substantial stiction and coulomb friction during sliding, and to require a very high breakaway force, all of which contribute to force noise at the hydraulic actuator output and thereby limit the ability to accurately estimate output force. Dynamically, a range of factors, including non-linear flow characteristics, can be very difficult to control.

There have been attempts to reduce the sliding friction and stiction characteristic of tight hydraulic seals by, e.g., reducing the piston seal tolerance. In one example alternative, two or more sets of loose seals are employed, the first seal allowing leakage from the supply fluid pressure chamber and the second and following seals scavenging the leakage. Although this configuration can improve sliding characteristics, it is not cost effective for most applications and in practice can be very prone to leaks. As a result, for most applications only tight hydraulic seals can be employed.

Given this fundamental difficulty in estimating the output force of a hydraulic actuator as function of hydraulic pressure, hydraulic actuators have been largely limited to velocity and position control applications. Implementation of force control for robotic and other applications in a manner that exploits the high power density of hydraulic actuation has heretofore not been fully practical.

SUMMARY OF THE INVENTION

The invention provides the ability to effectively and precisely implement closed-loop force control of a hydraulic actuator, provided in accordance with the invention as a hydro-elastic actuator. The hydro-elastic actuator of the invention includes a hydraulic actuator, having a connection to hydraulic fluid and including a mechanical displacement member positioned to be mechanically displaced by fluid flow at the actuator. A valve is connected at the hydraulic actuator connection and has a port for input and output of fluid to and from the valve. At least one elastic element is provided in series with the mechanical displacement member of the hydraulic actuator and is positioned to deliver, to a load, force generated by the hydraulic actuator. A transducer is positioned to measure a physical parameter indicative of the force delivered by the elastic element and to generate a corresponding transducer signal. A force controller is connected between the transducer and the valve to control the valve, based on the transducer signal, for correspondingly actuating the hydraulic actuator and deflecting the elastic element.

The hydro-elastic actuator of the invention can be configured such that the force controller is connected to accept an input indicative of a desired actuator output force to be delivered to the load. Here the force controller is connected between the transducer and the valve to control the valve based on the transducer signal and the input, for correspondingly actuating the hydraulic actuator by an amount that delivers to the load the a desired actuator output force.

The hydro-elastic actuator of the invention provides the ability to make a high-fidelity measurement of the output force of a hydraulic system without measuring pressure or flow characteristics of the hydraulic system. The feedback control loop enables precise hydraulic system force control and control stability to a level not previously achievable without complicated control schemes to accommodate hydraulic characteristics. The high power and high force generation capabilities of the hydraulic actuator are preserved while providing shock tolerance and low system output impedance.

The hydro-elastic actuator of the invention is well-suited for an extremely broad range of applications, and is particularly effective at addressing high-force, high-power density applications. Robotics applications and heavy equipment operations, such as robotic fire fighting and earth moving, as well as telerobotic and haptic systems, are particularly well-addressed. Further, the important and growing class of biomimetic robots, and particularly dynamically-stable legged robots, which primarily rely on force control-based locomotion algorithms, are enabled by the invention to take on mass and scale not previously attainable.

In accordance with the invention, the hydraulic actuator can be provided as a hydraulic actuation chamber in which the mechanical displacement member is disposed with respect to the fluid connection. Here the fluid connection preferably consists of a fluid inlet and a fluid outlet of the chamber. This enables control of displacement of the displacement member by fluid flow into and out of the chamber.

The valve can be connected to the fluid inlet and fluid outlet, and preferably is provided as a flow control valve. Whatever connection is employed between the valve and the fluid inlet and outlet, it preferably is dimensionally fixed. The valve port can include a connection for receiving fluid pumped by a fluidic pump.

In embodiments of the invention, the valve control signal is based on proportional or proportional-integral control of actuator output force. The valve control signal is in one embodiment an electrical current. This electrical control current is directed to the valve and is indicative of a controlled fluid flow to be produced through the valve. The electrical control current can be indicative of a controlled bi-state valve operation between a state of zero fluid flow and a state of maximum fluid flow through the valve. The force controller can further be connected to produce a fluid source control signal directed to a fluid source connected to the valve port. Here the fluid source control signal can be indicative of a controlled pulsed delivery of fluid to the valve in synchrony with the bi-state valve operation.

In accordance with the invention, the hydraulic actuator, when provided as a chamber, can consist of a linear piston chamber having a linear piston and a piston push rod extending out of the chamber, a rotary piston chamber having a rotary vane and a rotary shaft extending out of the chamber, or other suitable chamber configuration. When employed, a piston can be double- or single-acting. Preferably either a substantially non-leaky seal is provided at a location where the piston push rod or shaft extends out of the chamber or alternatively, at least one leaky seal and at least one leakage scavenger seal can here be employed.

In embodiments of the invention, the elastic element can be provided as a linear or a nonlinear elastic element. The elastic element can be provided specifically as at least one spring disposed in series with the hydraulic actuator displacement member, or as a plurality of springs positioned to together result in an elasticity provided in series with the hydraulic actuator displacement member. One or more coupling elements can be provided in series with and between the elastic element and the hydraulic actuator displacement member, as well as in series with and between the elastic element and the load.

The transducer can be provided as a potentiometer, a strain gauge, or other suitable sensing configuration, e.g., as a magnetic position sensor or an optical position sensor. In one embodiment, the transducer signal is based on deflection of the elastic element.

The hydro-elastic actuator of the invention can be produced of lightweight, low-cost, easily manufactured components. The elastic element force feedback control of the system preserves the high power and high force or torque generation of the system while providing precise force control and good force control stability. These characteristics are ideal for robotic and other mechanistic systems that interact with their environment. Other applications, features, and advantages of the invention will be apparent from the following description and associated drawings, and from the claims.

DETAILED DESCRIPTION OF THE INVENTION

Figure 1:
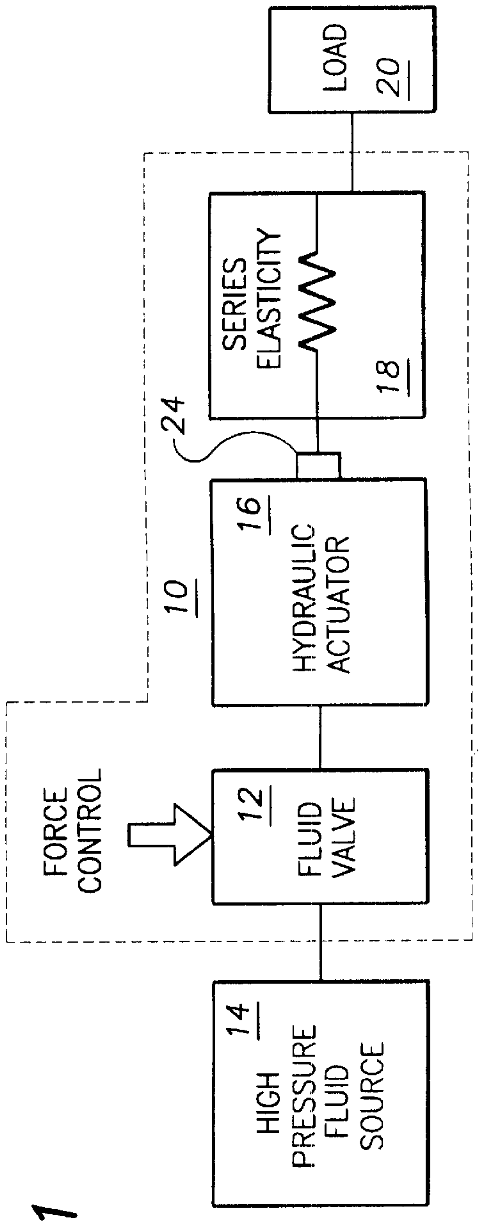
FIG. 1 is a block diagram of components of a hydro-elastic actuator in accordance with the invention.

FIG. 1 illustrates example components of a hydro-elastic force-controlled actuator 10 in accordance with the invention. The actuator includes a fluid valve 12 suitably arranged to enable connection to a high pressure fluid source 14. The fluid source is provided with a suitable hydraulic fluid that is preferably selected, based on the requirements of a given application, as e.g., water or oil, either natural or synthetic. The fluid valve 12 controls flow of the hydraulic fluid to and from a hydraulic actuator 16 in which is provided a mechanical actuation member, i.e., a mechanical displacement member, for converting hydraulic fluid flow and its corresponding pressure to mechanical position and velocity.

An elastic element 18 is linked in series with an actuation member 24 of the actuator 16 and interacts with the actuator environment, e.g., a load 20, such as a physical mass, to be manipulated, or e.g., the ground. The physical output of the hydro-elastic actuator of the invention is thus shifted from the actuation member 24 of the actuator to at least the output end of the elastic element 18 or a later element, as described below.

In accordance with the invention, the elastic element is positioned to deliver the force of the actuator to the load and to enable measurement of a physical parameter indicative of the delivered force, eliminating the need for a hydraulic pressure or flow measurement. As explained in detail below, this configuration enables precise force control of the hydro-elastic element. The hydro-elastic force control is in accordance with the invention effected through control of the hydraulic fluid valve of the actuation system.

Figure 2:
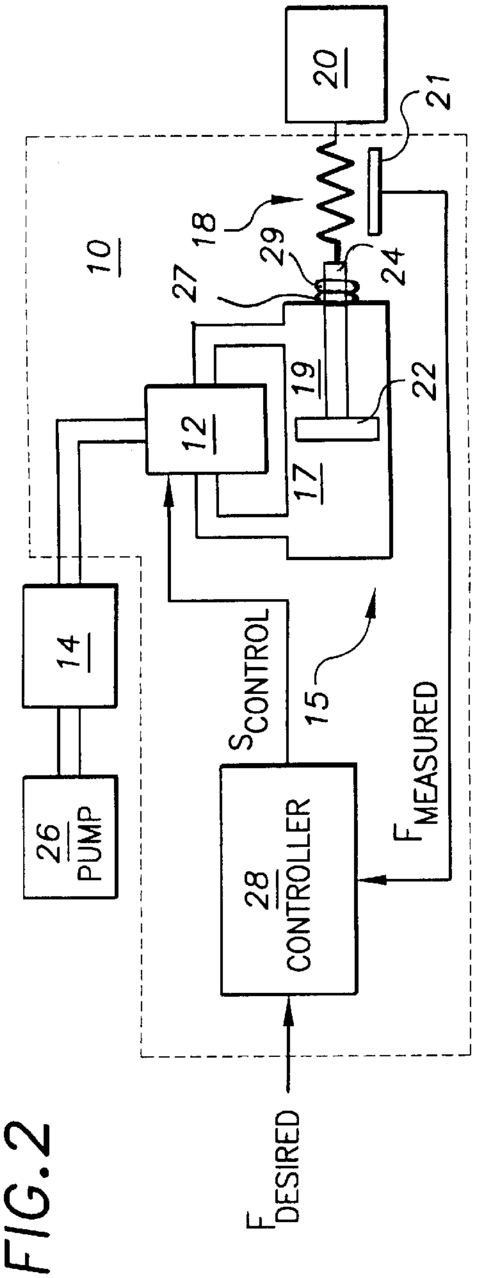
FIG. 2 schematically illustrates an example implementation of the hydro-elastic actuator of FIG. 1 in more detail, including a force control configuration provided by the invention.

FIG. 2 schematically illustrates an example embodiment of the hydro-elastic actuator of the invention. The hydraulic actuator is here provided as a hydraulic actuation chamber 15, consisting of a piston cylinder, including a piston 22 and a push rod 24 connected to the piston and extending out of the chamber 15. An elastic element 18 is positioned in series at the output of the push rod 24 for interaction with, e.g., a load 20. The elastic element is positioned to alone support the full force of the load. The force generated by the actuation system is thus delivered to the load fully by the elastic element.

As explained in detail below, direct physical connection of the elastic element to the push rod and to the load is not required; one or more intermediate coupling elements can be included on either side of the elastic element. If included, however, such intermediate elements preferably maintain a condition in which the elastic element supports the full force of the load, and intermediate elements at the output of the elastic element are preferably characterized as low friction, backdrivable elements.

A transducer 21 is positioned at a suitable point in the system to sense some measurable physical aspect of the system that can be correlated to force delivered by the elastic element. For many applications, a convenient transducer configuration is one in which changes in position or strain of the elastic element are measured. Whatever configuration is employed, the signal produced by the transducer is manipulated to directly or indirectly infer the force delivered by the elastic element to the load, thereby enabling a measurement of actuator output force, $F_{Measured}$.

The force measurement, $F_{Measured}$, is directed to an active controller 28 to which can also optionally be directed an indication of the desired actuator output force, $F_{Desired}$, to be delivered by the elastic element to the load. The controller 28, described in detail below, produces a control signal, $S_{Control}$, that is directed to the hydraulic valve 14 for controlling hydraulic fluid flow and/or pressure into and of the piston chamber. This valve control in turn controls conversion of fluidic power to mechanical power of the hydraulic piston and the resulting position and velocity of the push rod. The push rod movement acts to compress or decompress the elastic element, to thereby deliver a desired output actuator force through the elastic element to the load.

With this operation, it is found that the elastic element configuration of the invention provides the ability to make a high-fidelity measurement of the output force of a hydraulic system without measuring pressure or flow characteristics of the hydraulic system. This is achieved in the invention firstly by providing the elastic element in series with the mechanical member of the actuator and positioned to deliver the actuator force to a load, that is, positioned generally at a point in the system after the mechanical actuation member, i.e., after the point of fluid-to-mechanical power conversion. This is achieved in the invention secondly by making a physical measurement indicative of delivered force, preferably at a system location that is also after the point of fluid-to-mechanical power conversion. With this arrangement, a measurement indicative of force delivered by the elastic element enables precise hydraulic system force control, not previously achievable without complicated control schemes to accommodate hydraulic characteristics.

Because the force control of the invention does not rely on hydraulic system pressure measurement, no particular system features are required to enable such. As a result, the hydro-elastic actuator of the invention can accommodate inexpensive, off-the-shelf hydraulic cylinders having robust, non-leaky, high-friction seals and high breakaway force mechanical actuating elements. Piston stiction and coulomb friction, as well as supply pressure variations and non-linear flow characteristics, have substantially no effect on the force control capabilities of the system. The control loop can compensate for system noise and imprecise hydraulic operating parameters because the physical parameter measurement indicative of force need not be made at a point where such can occur.

In addition, because the series elasticity of the system influences the feed back control of the hydraulic mechanical actuation member velocity, the high-impedance position output of the mechanical member is converted to a low-impedance force output at the end of the elastic element. This low output impedance significantly decouples the actuator dynamics from that of the load. As a result, the output force of the system is substantially independent of load motion and breakaway force. The high power and high force or torque generation of the hydraulic system is preserved while providing shock tolerance, precise force control, and good force control stability.

The invention does not require a particular system geometry or topology to produce active feedback force control; all that is required is an elastic element provided in a series connection with the hydraulic actuator's mechanical output, preferably disposed at a point after the actuator's output, and a configuration, preferably also located at a point after the actuator's, for making a measurement indicative of the force delivered by the elastic element. With this arrangement, the elastic element both delivers the actuation force to the load and acts as a measurement point for making a direct measurement indicative of delivered force. The configuration shown in FIG. 2 is provided only as a generic example highlighting the system components. The characteristics of the hydraulic fluid supply 14, valve 12, and chamber 15 are preferably selected based on the force, speed, and power requirements of a given task, as with conventional hydraulic actuation systems.

The high pressure fluid source 14 can be provided by employing a fluid supply in conjunction with a high pressure pump 26, or by another suitable configuration, e.g., as a store of high pressure fluid in an accumulator of a high-pressure system. This scenario can be preferable for some applications in that it enables actuator operation even when the pressure source is not operating.

The valve 12 of the hydraulic system can be provided as, e.g., a spool valve or servo valve, preferably having connections to fluid supply and fluid return lines. No particular characteristics of the fluidic supply lines are required other than, for most applications, a preferable condition that little or no fluid leakage occurs. The valve preferably accommodates electronic control for modulating the hydraulic liquid flow through the valve based on a control signal, e.g., a control input current, produced by the feedback controller. Although pressure control rather than fluid flow control can be employed, it is preferred that the valve control fluid flow, rather than fluid pressure, in the hydraulic chamber. Flow control is in general more reliable than pressure control and enables subtle changes in piston motion that can be required for applications of the actuator. Fluid flow control can be provided with any convenient configuration, e.g., with a servo valve, or by employing directional jet control or other control of fluid motion.

In a simplest configuration, the hydraulic fluid supply is provided as a constant pressure, variable flow source of fluid and the selected hydraulic valve is continuously modulated in an analog manner to control the velocity of fluid traveling into or out of the hydraulic chamber. Although this proportional-type fluid control technique is simple and smooth, the technique can be inefficient in some applications because it causes a condition in which a pressure drop exists across the valve while fluid is flowing through the valve. This condition results in power loss in the form of heat.

It is recognized in accordance with the invention that the efficiency of the fluid delivery system can be increased by discretely switching the valve between fully-on and fully-off states rather than continuously modulating the hydraulic valve state in an analog manner between the fully-on and fully-off positions. Discrete valve switching between on-off states increases valve efficiency because it requires that either no fluid flow occurs, when the valve is closed, or that little pressure drop exists, when the valve is open. Only during the valve switching action can fluid flow and pressure drop exist simultaneously. Because this condition occurs during only a small fraction of operation, the power loss of the valve can be significantly reduced.

To further reduce hydraulic power loss, the hydraulic fluid source can also be pulsed, either in pressure or in flow, in coordination with the valve switching between binary states. For example, the fluid pressure or fluid flow can be periodically dropped to zero, during which time the hydraulic valve is switched between states. This coordination of hydraulic fluid source pulsing with hydraulic valve switching results in very little power loss. Periodic oscillation of the hydraulic fluid pressure and/or flow can be implemented with, e.g., an oscillatory pump.

Binary valve control and a pulsed fluid supply control both result in jerky, discretely-stepped hydraulic piston movement. In a conventional hydraulic system, this discrete piston movement would couple directly to the actuator load, resulting in shock and vibration. But the series elastic element of the hydro-elastic actuation system decouples the motion of the piston from the motion of the load, whereby discrete movement of the piston produces discrete steps in load force but not in load motion. In addition, if the pressure or flow of the fluid supply is pulsed, then the rise and fall time of the pressure or flow change can be limited so as to correspondingly limit the velocity of the piston and thus limit the rate of change of the load force. In one example technique for accomplishing this limit in rise time, mechanical or acoustic resonant chambers are employed to produce and reinforce a sinusoidal modulation of the fluid pressure or flow. Mechanical pump mechanisms, such as a crankshaft, can also supply this pressure or flow modulation.

The elasticity of the hydro-elastic actuator is thus found to filter out the fluid pressure noise produced by stepped piston movement from binary valve and/or pulsed fluid source control. As a result, discrete valve switching can be employed to increase system efficiency while preserving smooth actuator output motion. In addition, binary valves reduce the complexity and cost of the system below that of analog valves, and binary valves generally are characterized by an operating bandwidth that is larger than that of analog valves. It is therefore understood that for many applications, binary rather than analog valves, optionally and preferably synchronized with pulsed flow or pressure control of the hydraulic fluid source, can be utilized. It is to be recognized, however, that there may be a tradeoff in actuator force precision for gains in efficiency. Control of a high frequency of valve operation and precise binary valve flow increments are required to enable high precision along with high efficiency.

The hydraulic actuator can be provided in any convenient configuration that converts fluid flow and its corresponding pressure to mechanical motion. For many applications, an actuator chamber, provided, as, e.g., a piston cylinder design like that shown in FIG. 2 is most convenient. The piston 22 defines two substantially isolated chamber volumes 17, 19. A single acting piston, like that shown, two single acting pistons operated in synchrony, or a double acting piston configuration can be employed. It is recognized that a single acting piston design results in unequal volumes 17, 19 and unequal areas on each side of the face of the piston, given that one face is attached to the push rod. This condition impacts the transmission ratio in conversion of hydraulic pressure and flow to mechanical force and velocity and in turn alters the gain of the force feedback control loop of the system. It is found, however, that the gain margin of the force feedback control loop can be made sufficiently high to provide a stability margin for changes in loop gain. As a result, a single acting piston is acceptable for most applications.

In accordance with the invention, a rotary vane hydraulic cylinder having an output shaft, as well as linear piston arrangements having output push rods, can be employed. Indeed, the invention does not specifically require the use of a piston; other mechanical arrangements can be employed for converting fluidic power to mechanical motion. It is not required that the actuator include two isolated chamber volumes or that the actuator enable by fluid flow both forward and backward movement of the actuator's mechanical displacement member. A single chamber volume can be employed, and, e.g., a mechanical member can be provided for moving the displacement member in one direction.

Given that a hydraulic chamber configuration is employed, the chamber preferably is formed of a material and a geometry providing strength sufficient to support the fluidic pressure developed internal to the chamber. The dimensions of the chamber and the mechanical actuating member of the chamber are preferably set by the force and speed requirements of the application and particularly by the characteristics of the expected load. The fluidic connection between the valve and the hydraulic chamber is preferably provided as one or more dimensionally-fixed tubes or pipes of a strength sufficient to maintain the pressure of the fluid flowing through them. Structural compliance in a fluid delivery line between the valve and the hydraulic chamber is preferably to be avoided.

As explained above, the hydro-elastic actuator of the invention does not rely on measurement of pressure or flow of hydraulic fluid through the system. As a result, no particular arrangement of fluidic seals to the hydraulic chamber is required. Tight, high-friction seals can be employed without limiting the ability of the system to precisely control output force. It can be preferred for many applications that the seals be substantially non-leaky. A series of loose-fitting seals, including, e.g., one or more leaky seals 27 and one or more scavenger seals can be employed, as shown in FIG. 2, but are not required by the invention. Friction-fit, and other such seals can also be employed when suitable for a given application. It is preferable for most applications for any selected seal and fluid delivery configuration that fluidic leaks from the system be eliminated or at least minimized.

This condition can be particularly advantageous when exploiting a lock mode condition enabled by the hydro-elastic actuator. Such a lock mode can be set up by closing off all fluidic connections to the hydraulic actuator, e.g., by closing the fluid inlet and outlet ports to a hydraulic chamber. With this condition, no changes in actuator displacement member position occur. As a result, a constant output force can be maintained without any hydraulic actuator power generation or expenditure. Correspondingly, a force applied to the elastic element by a load will be absorbed by the elastic element, without generating power at the hydraulic actuator; the elastic element returns the force to the load without power expenditure by the actuator. Thus, to maintain a robust lock mode, hydraulic actuator leakage is preferably minimized.

The series elastic element can be provided as any suitable element or combination of elements that together are characterized by some degree of elasticity. For many applications, it can be preferred that the elastic element be characterized by significant elasticity. A high degree of elasticity enables high force sensitivity by a large signal-to-distance of motion ratio, enables a large signal-to-noise ratio, and provides a high degree of shock tolerance. These advantages are specifically achieved when the elastic element's degree of elasticity, i.e., the elastic element's compliance, dominates that of the actuator system. In other words, the stiffness of the elastic element should not dominate the system.

Linear or non-linear elastic elements can be employed in accordance with the invention. For many applications, it can be preferred that the elastic element be characterized by high energy density, high specific energy, low hysteresis, i.e., low energy loss per compression cycle, low viscosity, low cost, long lifetime, and practical manufacturability. It is also generally preferred that the elastic element be of a geometry that is easily disposed in an appropriate configuration, preferably connected in series at a point in the system after the hydraulic cylinder piston rod or other hydraulic mechanical actuator, and the actuator load. The elastic element can be realized as two or more elements, in any arrangement, that cooperate to provide a desired elastic characteristic.

Springs formed of, e.g., steel, aluminum, delrin, nylon, or other material can be employed. In addition, where appropriate, an air spring can be employed. For some applications, it can be advantageous to utilize a hardening spring, provided as, e.g., a non-linear elastic material such as a rubber, or a mechanical mechanism, such as a toggle, that mechanically converts a linear elastic element into a hardening elastic element.

Because the output force of the hydro-elastic actuator is delivered to the load by deflection of the elastic element, the spring constant of the elastic element is preferably selected based specifically on the operating and load requirements of a given application. In general, the spring constant selection requires a tradeoff between large actuation bandwidth, corresponding to a high spring constant, and actuator output impedance, corresponding to a low spring constant. For many applications, overriding both of these tradeoffs is a preference for a degree of spring compliance that dominates the compliance of the actuator system.

It is found that in practical terms, optimal selection of a spring constant for a given application can require prototyping and design iterations. In one example design scenario in accordance with the invention, first a hydraulic servo valve, piston chamber and push rod design, and supply pressure are selected based on the force, speed, and power requirements of a given application. The characteristics of the servo valve then set the maximum bandwidth of the actuator. The minimum acceptable break point in the large force bandwidth characteristic of the actuator is then specified. Because the characteristics of the servo valve, the piston area, and the spring constant define the break point value, the break point value in turn defines a lower bound on the spring constant.

The minimum tolerable impedance level that can be accommodated by the application task is then specified, defining an upper bound on the spring constant. Finally, the spring constant is selected as a value between the two defined bounds. In practice, it can be required to iterate and fine tune the spring constant selection to achieve a desired system transfer function for a given application. The force feedback control system expressions, described in detail below, can be employed to evaluate the suitability of a selected spring constant.

Turning now to techniques for sensing the output force delivered by the elastic element, as explained above a physical measurement indicative of delivered force is made of the actuator system, preferably at a point after the hydraulic fluid-to-mechanical conversion location. This enables a measurement that is not impacted by the imprecise nature of the hydraulic system characteristics. Because the elastic element delivers the actuator force by a mechanical action, namely, compression or decompression, the elastic element itself can be employed for making a physical measurement indicative of the delivered force. If a linear elastic element is employed, the linearity enables a force measurement based on elastic element stretch or angle of twist. The stretch (or compression) or angle of twist of the elastic element can be measured directly to determine the output force producing such stretch or twist. This measurement technique can be particularly advantageous in that it requires only one sensor, and therefore requires little calibration, while at the same time providing high accuracy through high resolution, enabled in the manner described above by significant compliance of the elastic element.

Direct elastic element stretch, compression, or twist can be measured by any suitable configuration, including a linear or rotary potentiometer, or one or more strain gauges. The selection of a transducer is preferably based on the geometry and configuration of a given actuator arrangement. For example, it can be found that a potentiometer configuration is convenient and preferable for linear-motion actuators, while a strain gauge configuration can be preferred for rotary-motion actuators, in which the spring is often provided as in a torsional configuration. Of course, the particular geometry of a selected elastic element can lend itself to a particular sensing and transducer configuration most suitable for a given application.

The invention is not limited to use of a potentiometer or a strain gauge for determining elastic element output force. A hall-effect sensor, optical sensor, encoder, magneto-resistive sensor, or other type of position transducer can be employed. For example, a position sensor can be located at each end of the elastic element for measuring distance to determine changes in length of the element. For some applications, it can be convenient and preferred to connect position sensors to each end of the element. Whatever transducer configuration is employed, it preferably enables positioning of the transducer on the elastic element itself or on a fixture that is integrated or easily interfaced with the hydro-elastic actuator assembly.

Figure 3:
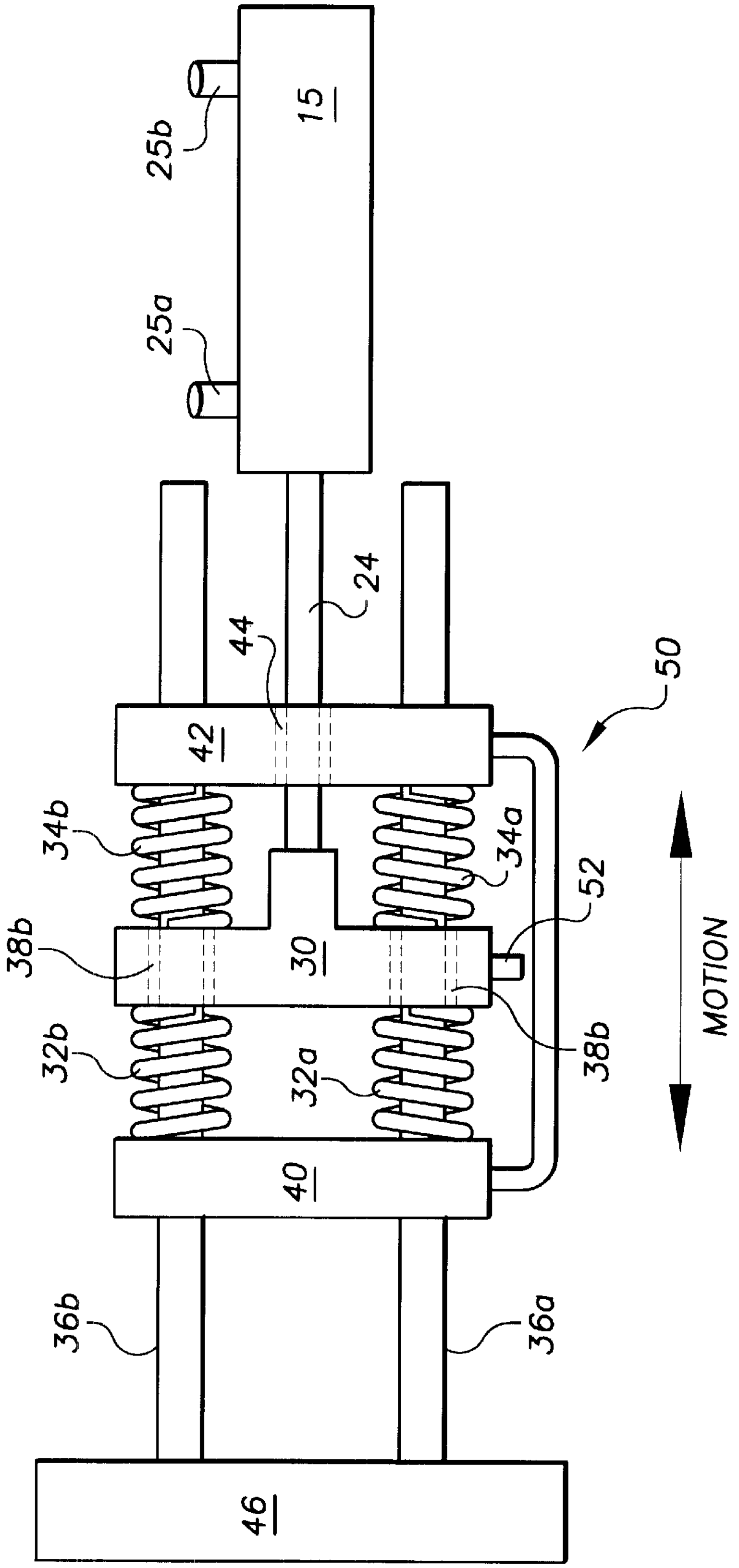
FIG. 3 is a detailed view of a particular example implementation of the hydraulic actuator and elastic element of FIG. 2.

Referring to FIG. 3, there is schematically represented an example arrangement of the hydro-elastic actuator elements described above. A hydraulic piston chamber 15 is provided, having fluidic connections 25*a*, 25*b* to a fluidic valve like that shown in FIG. 2. At the output of the piston chamber extends a piston push rod 24. The piston push rod is in turn connected at its end to a push rod extension 30.

The series elastic element is in this configuration provided as combination of discrete springs, namely, two forward springs 32*a*, 32*b*, located forward of the extension 30 and two rearward springs 34*a*, 34*b*, located rear of the extension 30. All four springs can be embodied as, e.g., die compression springs. The springs are guided by guiding rods 36*a*, 36*b*, over which the springs are provided. The guiding rods do not provide load bearing support for the springs or the actuator load; as explained above, the load is supported entirely by the elastic element, here consisting of the four springs. The guiding rods are provided only for maintenance of the spring alignment as the springs stretch and compress, and such is not in general required by the invention.

The push rod extension 30 includes through holes 38*a*, 38*b*, through which the guiding rods 36*a*, 36*b*, respectively, are fed, enabling the extension 30 and the guiding rods to slide with respect to each other. A forward clamp 40 and a rear clamp 42 are provided, mechanically fixed to the guiding rods 36*a*, 36*b*. The rear clamp 42 includes a through hole 44 through which the push rod 24 can slide with respect to the rear clamp. As a result of this mechanical configuration, the guiding rods and the forward and rear clamps move together as a single unit separate from the push rod 24 and its extension 30.

In assembly of the system, the four springs are each compressed over the guiding rods against the extension 30 and then the forward and rear clamps are fixed in place on the guiding rods to maintain the springs' state of compression. The guiding rods extend past the forward clamp 40 to fixedly connect to an actuator load 46, whereby the load, like the forward and rear clamps, moves together with the guiding rods separate from the push rod and its extension. This particular example includes a moveable load mass and connects that mass to the output of the actuator, but it is to be recognized that a constrained load could also be accommodated by this configuration. For applications where the load is, e.g., ground, no connection arrangement forward of the forward clamp 40 is required.

In operation, when the piston push rod 24 is pushed out of the cylinder 15 by hydraulic flow and its corresponding pressure, moving the rod to the left in the figure, the extension 30 also moves to the left, sliding over the guiding rods 36*a*, 36*b*, reflecting the force generated by the hydraulic system. In turn, the forward springs 32*a*, 32*b* are compressed against the forward clamp 40 by the extension 30. This spring compression acts to deliver the actuator force to the load, causing the actuator load 40, by way of its fixed connection to the forward clamp through the guiding rods, to itself be pushed forward, given its unconstrained condition. When the push rod 24 is pulled back into the hydraulic cylinder 15, moving the rod to the right in the figure, the extension is correspondingly pulled to the right over the guiding rods, compressing the rear springs 34*a*, 34*b*, and stretching the forward springs 32*a*, 32*b*. With this spring condition, the actuator load 40 is pushed rearward by its connection to the clamps through the guiding rods.

This actuator operation demonstrates that the springs convert the motion of the piston push rod to an output force applied by the springs against the forward and rear clamps, which in turn apply the force to the actuator load through the guiding rods. Thus, although several intermediate coupling elements, such as guiding rods and clamps, are included, the configuration provides a series connection of elasticity between the hydraulic chamber output and the actuator load, with the springs delivering the actuator force to the load. The motion of the piston push rod is in series with the output of the springs. The springs deliver the actuator force to the load and fully support the load. Given that the springs are linear, the actuator maintains a linear, measurable stiffness and deflection.

A linear potentiometer 50, shown only schematically, is in this example connected to the forward and rear clamp configuration to precisely measure deflection of the springs for enabling force control of the hydraulic system. In one example arrangement, the potentiometer is fastened to the forward and rear clamps, with a linear wiper 52 fixed to the push rod extension 30. As the extension moves relative to the forward and rear clamps, due to spring compression or stretch, the wiper 52 adjusts the potentiometer voltage to produce a transducer output voltage corresponding to the wiper position.

Figure 4:
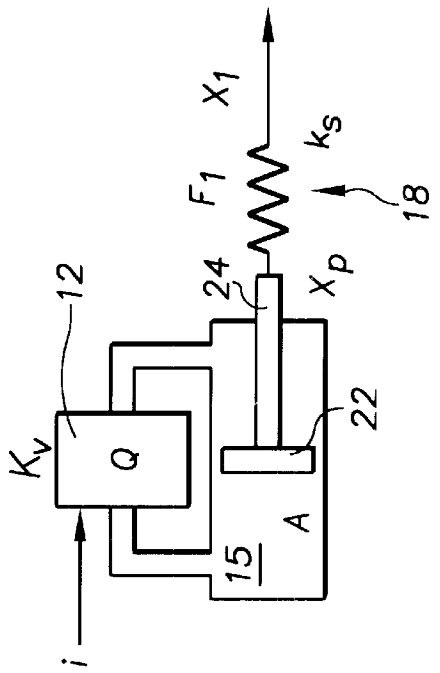
FIG. 4 is a diagram identifying parameters of the hydro-elastic actuator that are employed in the feedback force control loop provided by the invention.

With such a potentiometer voltage, or other signal indicative of a physical attribute of the elastic element, or other element of the actuator, that can be related to delivered force, the force control loop of the actuator controls the hydraulic chamber valve to in turn control the delivery of force through the elastic element. The diagram of FIG. 4 defines the system parameters on which the force feedback control is based. In the example shown in the figure, a control signal provided as an electrical control current, i, is directed to the hydraulic valve 12 to control the flow rate, Q, of fluid into the hydraulic chamber 16. The valve is assumed in this analysis to be a first order linear system. The valve is characterized by a valve gain factor, $K_v$, relating the electrical control current signal to the valve flow rate, Q.

Within the hydraulic actuator, e.g., a chamber, an actuating member, here a piston, is characterized by an area, A. In this analysis, the difference in area between the two piston faces is ignored, an assumption found to be acceptable for most applications. Displacement of the piston push rod 24 is characterized by a position, $X_p$, that results from fluid flow into and out of the hydraulic chamber. The elastic element 18, linked in series with the piston push rod, is characterized by a spring constant, $k_s$, for delivering to the load a force, $F_l$. For a condition in which the load is unconstrained, displacement of the load in turn can be characterized by its position, $X_l$.

Assuming no power saturation in the actuator, the fluid flow, Q, from the valve into and out of the hydraulic chamber can be related as a direct function of the control current, i, as:

$$Q(s) = \frac{K_v}{\tau_v s + 1} i(s); \tag{1}$$

where $\tau_v$ is the first order time constant of the valve and s is the Laplace variable.

The position of the piston push rod is directly proportional to the flow rate, Q, as:

$$X_p(s) = \frac{Q(s)}{As} = \frac{K_v}{As(\tau_v s + 1)} i(s); \tag{2}$$

where A is the area of the piston.

The deflection of the elastic element by the piston push rod determines the load force, $F_l$; therefore, the load force is directly related to the push rod and load positions as:

$$F_l(s)=k_s(X_p(s)-X_l(s)) \tag{3}$$

The correspondence between the push rod position, $X_p$, and the valve flow rate, Q, from expression (2) above, can then be substituted to produce a relation between load force and valve gain, $K_v$, as:

$$F_l(s) = k_s\left(\frac{K_v}{As(\tau_v s + 1)} i(s) - X_l(s)\right) \tag{4}$$

With this relationship between output force and valve gain defining a closed loop, output force can be controlled by a feedback control law directed to the valve.

In one example scenario in accordance with the invention, a proportional-integral (PI) control law is employed. While a simple proportional control law is found to be satisfactory for many applications, a proportional-integral control law can be preferable in that it automatically compensates for non-linearities, such as non-zero offset, in the valve operation that are not accounted for in the linear analysis. A PI control law also can be beneficial in producing a second order actuation system in which the actuator impedance is characterized as an equivalent mass at low frequencies.

A PI control law is characterized by a control gain, K, and an integral gain, $K_i$, which are each taken to be of appropriate units for relating desired output force, $F_d$, and load force, $F_l$, to electrical control current, i, sent to the valve to control fluid flow. The control law is also characterized by a proportional gain, $K_p$; for this application, the proportional gain is set to unity. The PI control law imposed on the valve control current, i, is then given as:

$$i(s)=K\left(1+\frac{K_i}{s}\right)(F_d(s)-F_l(s)) \tag{5}$$

The closed-loop control is then defined by imposing the control law given just above in expression (5) on the relationship between load force and valve gain, given in expression (4), resulting in a closed-loop control expression for the load force, $F_l$, delivered by the elastic element, as a function of desired force, $F_d$, and the load position, $X_l$:

$$F_l(s)=\frac{\left(\frac{s}{K_i}+1\right)F_d(s)-\frac{A}{KK_iK_v}s^2(\tau_v s+1)X_l(s)}{\frac{A}{k_sKK_iK_v}s^2(\tau_v s+1)+\frac{s}{K_i}+1} \tag{6}$$

Figure 5:
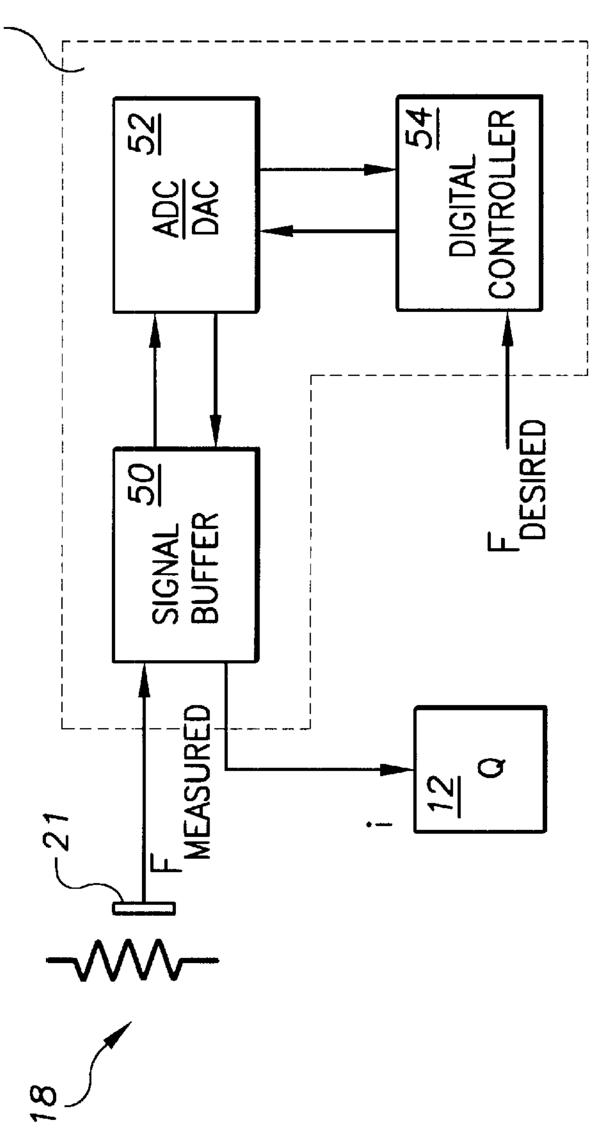
FIG. 5 is a block diagram of the components of the force controller of the invention.

FIG. 5 is a block diagram of a control loop implementing a control law such as this for the hydro-elastic actuator of the invention. A signal produced by the transducer 21 indicative of the delivered force, $F_{Measured}$ developed by the elastic element 18 is input to a signal buffer 50 and on to an analog-to-digital converter/digital-to-analog converter (ADC/DAC) 52. The digitized transducer signal is then processed by a digital controller 54 in which is implemented the control law given above, based on an input of an indication of the desired actuator output force, $F_{Desired}$. Based on the control law, the digital controller produces a valve control signal required to produce a hydraulic fluid flow, Q, for the desired actuator output force. This signal is returned to the ADC/DAC 52 and the signal buffer 50 and delivered to the valve 12 as a control current, i, for producing the specified fluid flow, Q.

Figure 6:
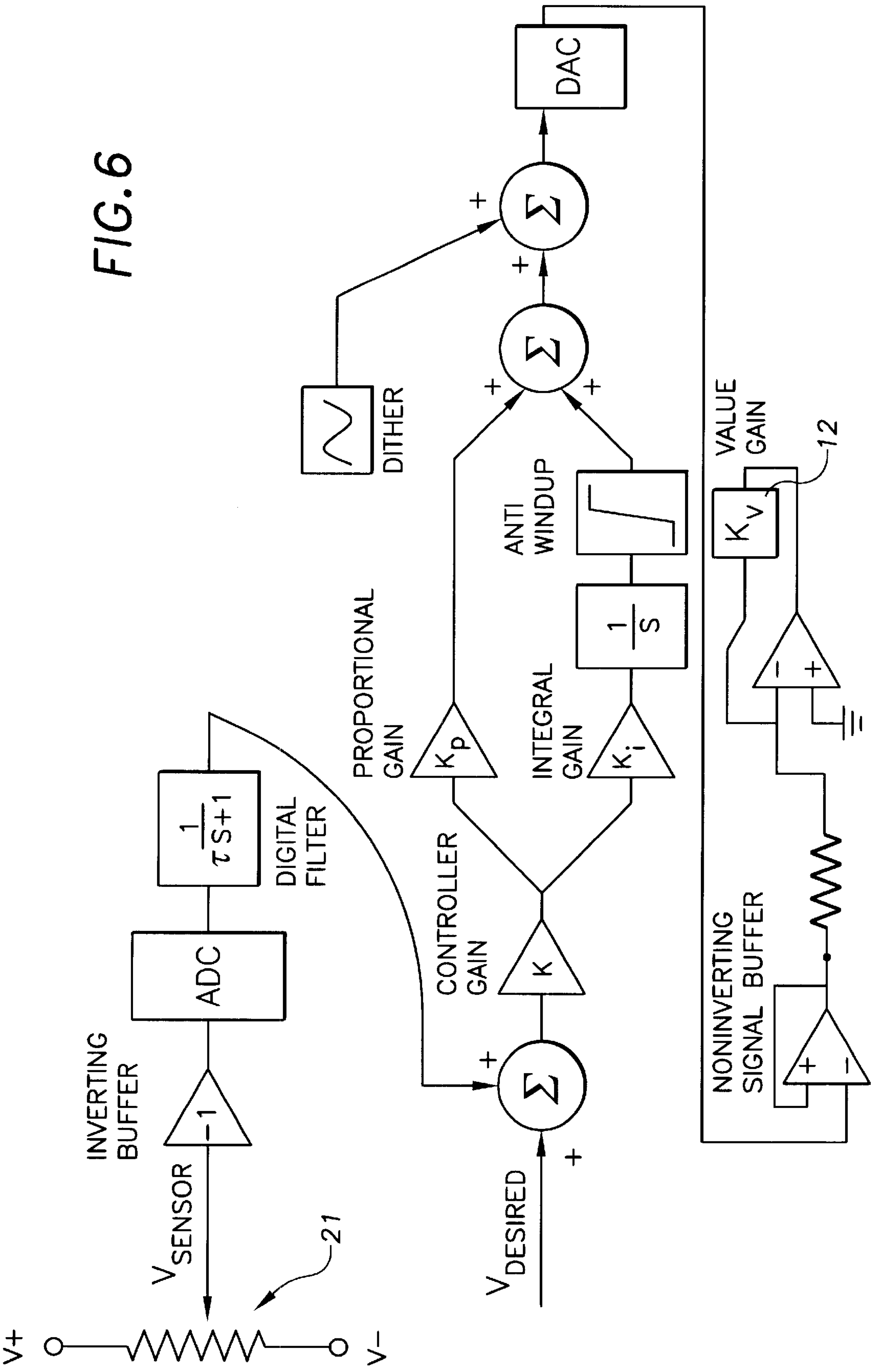
FIG. 6 is a schematic diagram of an example implementation of the force controller of FIG. 5.

FIG. 6 is a schematic diagram of an example implementation of the closed-loop force control. In this example, the transducer 21 is implemented as a potentiometer that produces a voltage, $V_{SENSOR}$, ranging in value between two boundary values, V+ and V−, indicative of the elastic element deflection. This sensor voltage signal is buffered, digitized, and filtered before it is summed with an input voltage value, $V_{Desired}$, provided as input to the actuator to indicate a desired actuator output force. The sum of the two voltage values is directed to proportional-integral control logic, and the resulting signal is summed with a dither signal, to eliminate steady state system hunting, in the manner described below. This signal is then converted back to the analog domain, buffered, and delivered to the valve 12 as an electrical current indicative of the fluid flow rate, Q, required of the valve to produce the desired output force. The controller can be implemented in customized hardware, in a computer, or other suitable arrangement. For many applications, it can be preferred to provide the digital control with a computer implementation, including a keyboard and display, to enable real-time control and display of the actuator operational parameters and force control behavior.

The invention does not require that an indication of a desired output force, $F_{Desired}$, be explicitly input to the force feedback controller. For some applications, it can be preferred that the desired output force be a constant or substantially constant value that is implemented as, e.g., an inherent characteristic of the controller or other element of the hydro-elastic actuator system itself. In such a case, no explicit input is required. In addition, it is contemplated that the desired output force can be a changing function, optionally based on changes in the environment, computed internally by the controller or externally and input to the controller, and can be specified as a range of values rather than a single value.

EXAMPLE

The hydro-elastic actuator configuration of FIG. 2 was implemented with a series elastic element arrangement like that of FIG. 3. A Standard Series 30 Servovalve, from Moog, Inc., East Aurora, New York, was employed, connected to a supply of MIL-H-5606 oil at a pressure of 20 MPa and a return line. The supply pressure was generated by a PVB10-FRSY31 pump from Sperry-Vickers Inc., of Eden Prairie, Minn. A 12.5 mm-diameter steel hydraulic cylinder, model AA1/24-1-1-4M-1-H from Custom Actuator Products, Minneapolis, Minn., was employed. This cylinder includes a single acting piston having a stroke of 10 cm. The areas of the two sides of the piston are not identical; the piston area on the side including the push rod is 0.97 $cm^2$, while the opposite piston area is 1.29 $cm^2$. This difference in piston area was found to be small enough to enable a linear control of the system. Connections between the fluid source and the valve and between the valve and the piston chamber were with 451TC-4 steel-reinforced rubber hoses with carbon steel hose end connectors, from Parker Fluid Connectors, Hose Products Division, Wickliffe, Ohio. Although the hose between the valve and the hydraulic chamber was not dimensionally fixed, in theory such is preferred.

The series elastic element was provided in the manner shown in FIG. 3, as four chrome alloy die compression springs, model No. D-1222-A, from Century Spring Corp., Los Angeles, Calif. Each of the springs was characterized by a free length of 3.2 cm and a spring constant of 286 kN/m. In the manner explained above, the springs were fed over guiding rods, here provided as carbon fiber reinforced polymer tubes having an outside diameter of 9.5 mm. This diameter is less than that of the spring coils, 9.6 mm, whereby the springs were free to stretch and compress over the tubes and were not mechanically supported by the tubes.

The piston push rod extension, forward and rear clamp elements, and load block were machined of 2024 aluminum alloy, with a width of 5.7 cm, a height of between 1.9 cm and 2.5 cm, and a thickness of 9.5 mm. The push rod extension was connected to the push rod end by way of a screw. The clamps were mechanically clamped in place on the polymer tubes. The tubes were clamped to the block acting as the actuator load.

Deflection of the springs was measured using a linear potentiometer, model PTN025 from Novotechnik, Southborough, Mass. An electrical wiper, model S170, also from Novotechnik, was affixed to the push rod extension in alignment with the potentiometer for producing a voltage signal indicative of spring deflection. The proportional-integral controller described above was employed to control the force delivered to the load by the springs by producing an electrical control current directed to the servo valve. The ADC/DAC was implemented as a DS1102 Controller Board from dSPACE Gmbh, Paderborn, Germany. The digital proportional-integral control was implemented in a computer using ControlDesk, also from dSPACE Gmbh. This implementation was found to be particularly efficient in that it enabled rapid control loop prototyping by way of a MATLAB/Simulink interface, and provided a virtual control panel on the computer screen for monitoring and controlling the actuator performance and operation.

Figure 7:
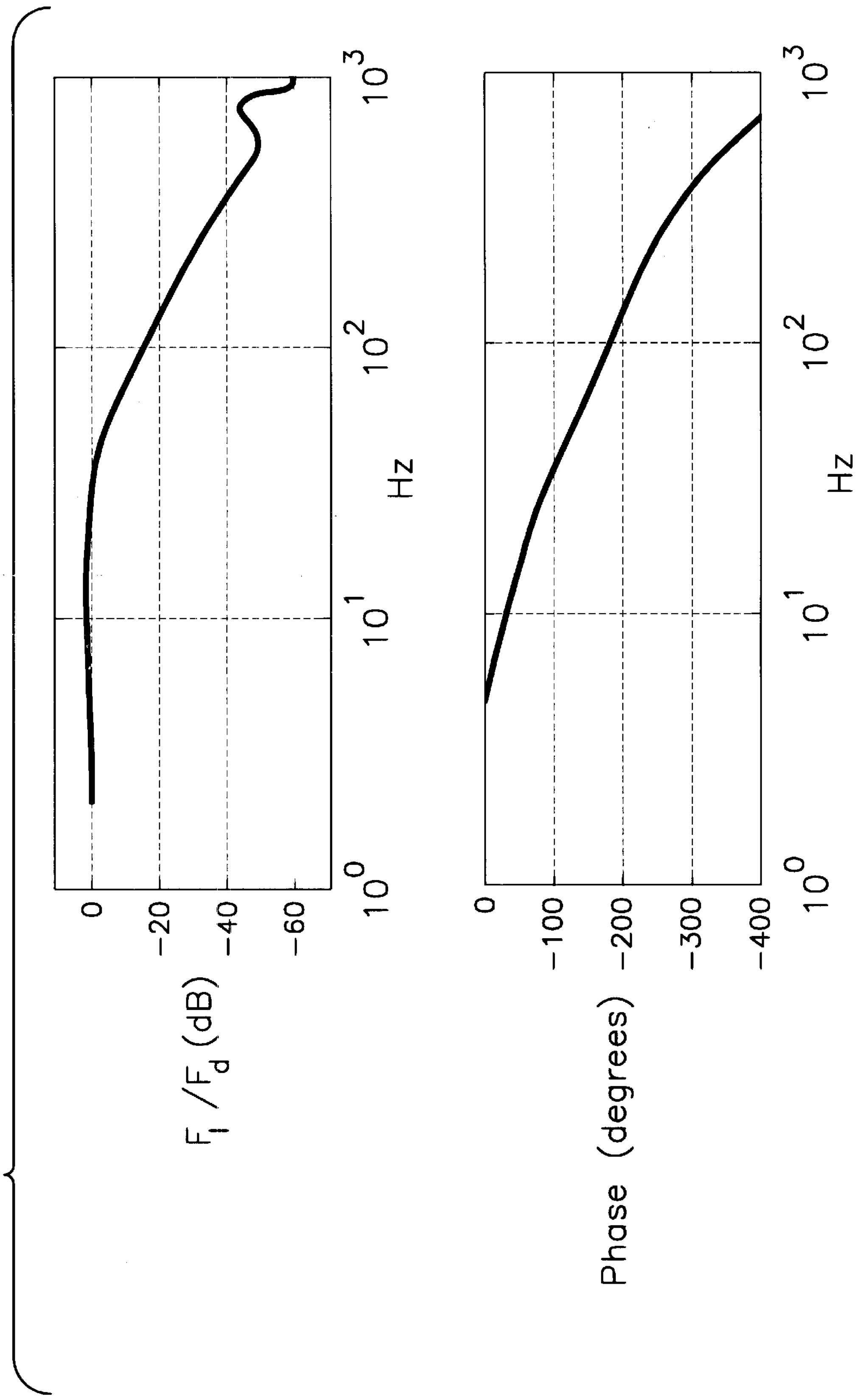
FIG. 7 are plots of the frequency magnitude and phase response of an experimental hydro-elastic actuator built in accordance with the invention.

FIG. 7 is a plot of the measured operating bandwidth of the experimental closed-loop force-controlled hydro-elastic actuator, for a proportional integral control law implemented with K, the controller gain, set at a value of 3 and $K_i$, the integral gain, set at 50. The closed loop response was measured with the load mechanically fixed. As shown in the plots, the experimental hydro-elastic actuator demonstrated good low frequency response. The response of the system was found not to degrade until about 35–40 Hz. This frequency is far above the operating frequency typically required for biomimetic robots, a class of robots particularly well-addressed by the actuator of the invention.

Figure 8:
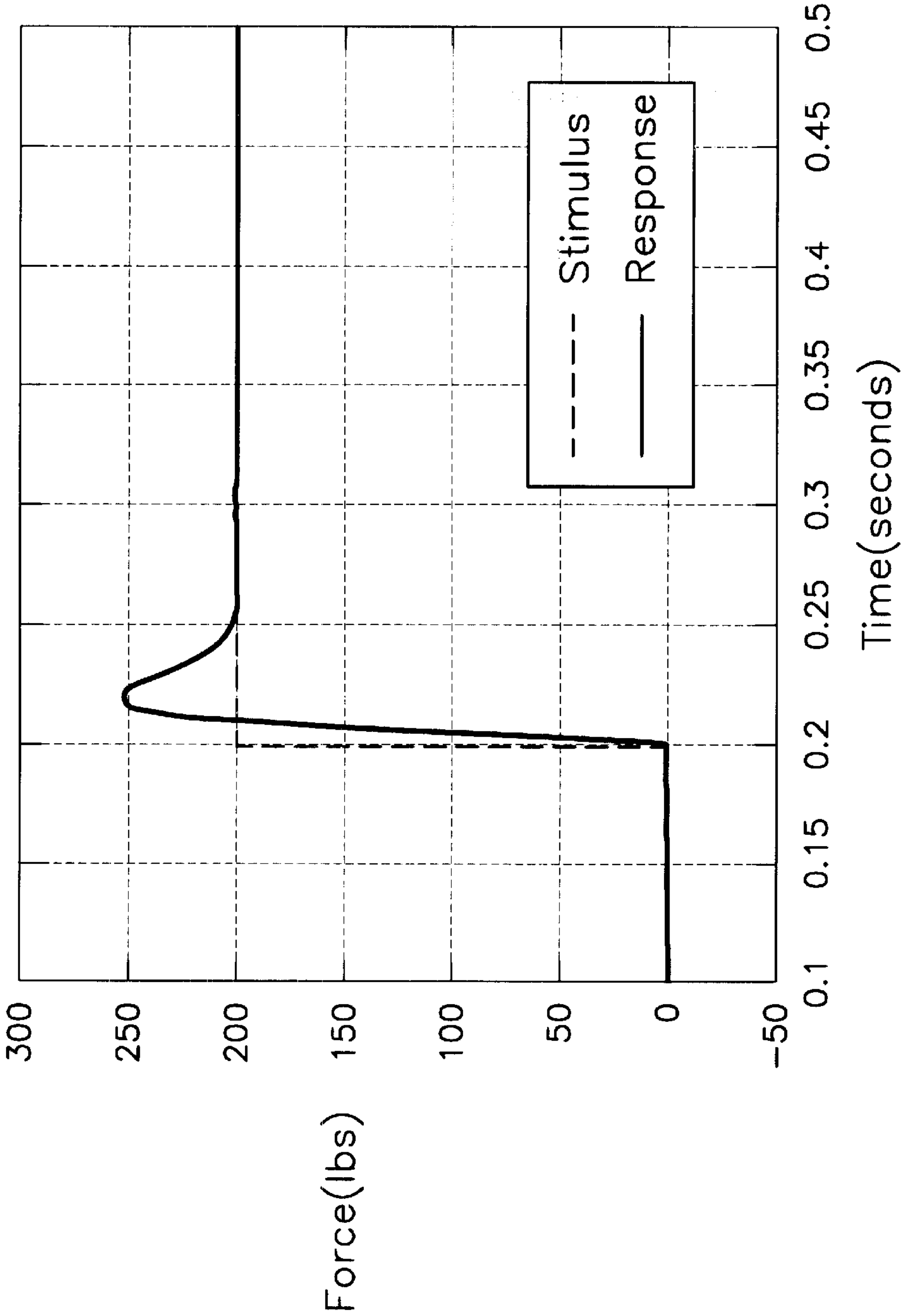
FIG. 8 is a plot of the step response of an experimental hydro-elastic actuator built in accordance with the invention.

FIG. 8 is a plot of an input step stimulus and the measured step response of the experimental actuator. The rise time of the actuator step response was about 10 msec and the settling time of the step response was relatively quick, about 50 msec, with minimal overshoot. It was found that due to a small degree of stiction at the piston-cylinder interface as well as in the servo valve, the controller tended to increase the control current to the servo valve until the stiction was overcome, at which point the control current level was reduced. This resulted in wandering, or hunting, of the system for the directed force in steady state. To overcome this condition, dither was added to the servo valve at 1% of the rated valve current, oscillating at 100 Hz, as shown in the schematic diagram of FIG. 6. It was recognized that such dither would increase fluid leakage through the valve, decreasing valve efficiency. However, it was found that the dither eliminated the steady state hunting condition, thereby improving the closed-loop steady state performance of the actuator. It is therefore understood that for many applications, it can be preferred to incorporate dither in the valve operation.

Figure 9:
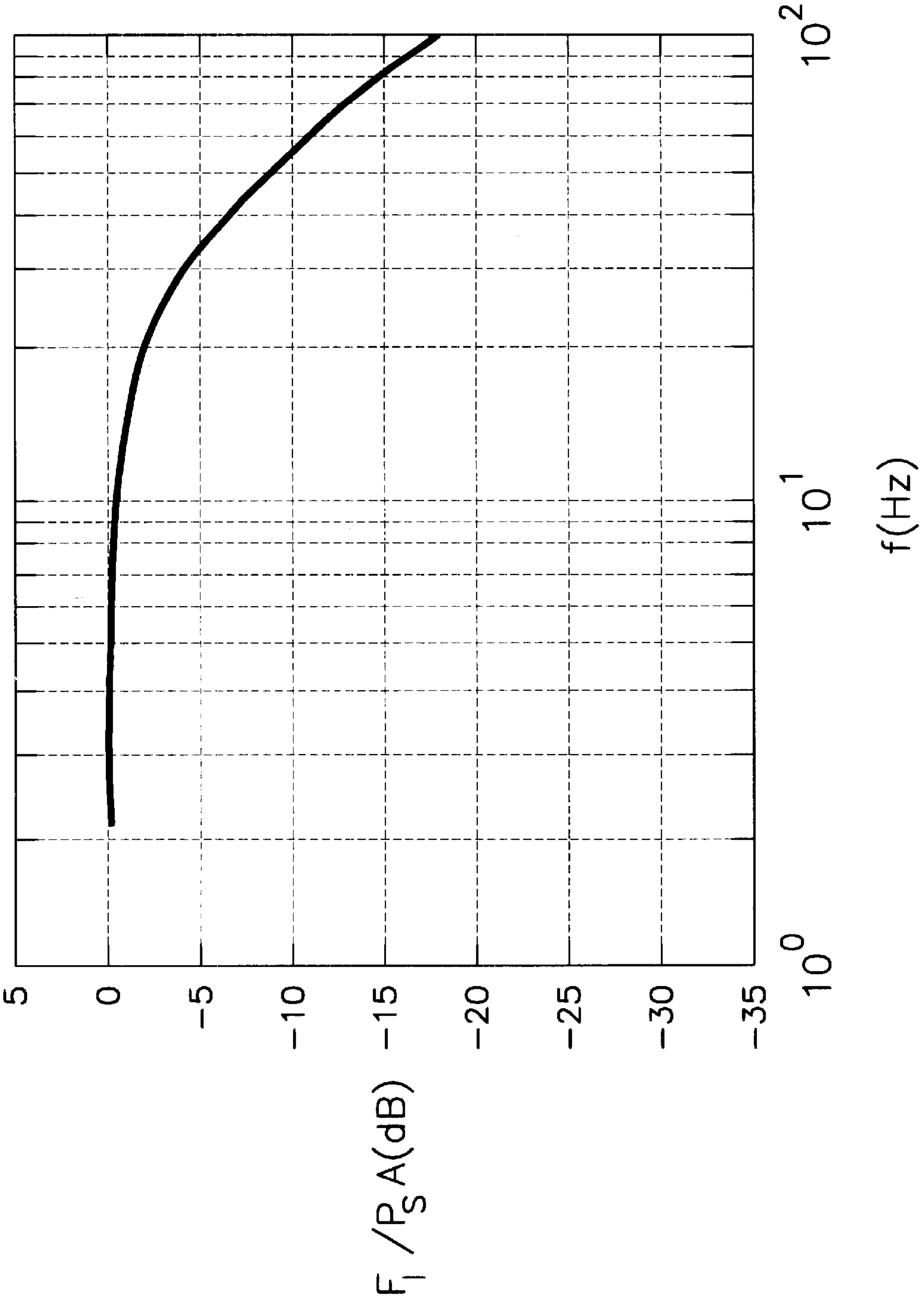
FIG. 9 is a plot of frequency magnitude response at maximum load of an experimental hydro-elastic actuator built in accordance with the invention.

To determine the effects of force saturation on the experimental actuator, the system was commanded to oscillate at its maximum force level, for a range in frequencies between 2 Hz and 100 Hz. FIG. 9 is a plot of the measured actuator response to this stimulus, normalized to the supply pressure, $P_s$, and the piston area, A. Force saturation is here defined as a condition occurring at a saturation operating frequency above which the actuator cannot deliver maximum force output at the actuator operating frequency. Force saturation can be an important characteristic of the actuator of the invention for configurations in which a significantly elastic element is included; here the actuator can be frequently operating near to a saturation level in order to physically move the distance required to compress the spring to its maximum force configuration. As shown in the plot of FIG. 9, the saturation frequency of the experimental actuator was found to be about 25 Hz, falling above this frequency at −40 dB/dec. The output force capability at an operating frequency of 10 Hz, a common actuation frequency, is found to be good.

In handling the experimental actuator, it was found that the output was easily backdrivable with finger force. The minimum resolvable DC force was measured to be about 4.4 newtons, indicating the degree of spring deflection corresponding to the noise floor of the potentiometer.

Figure 10:
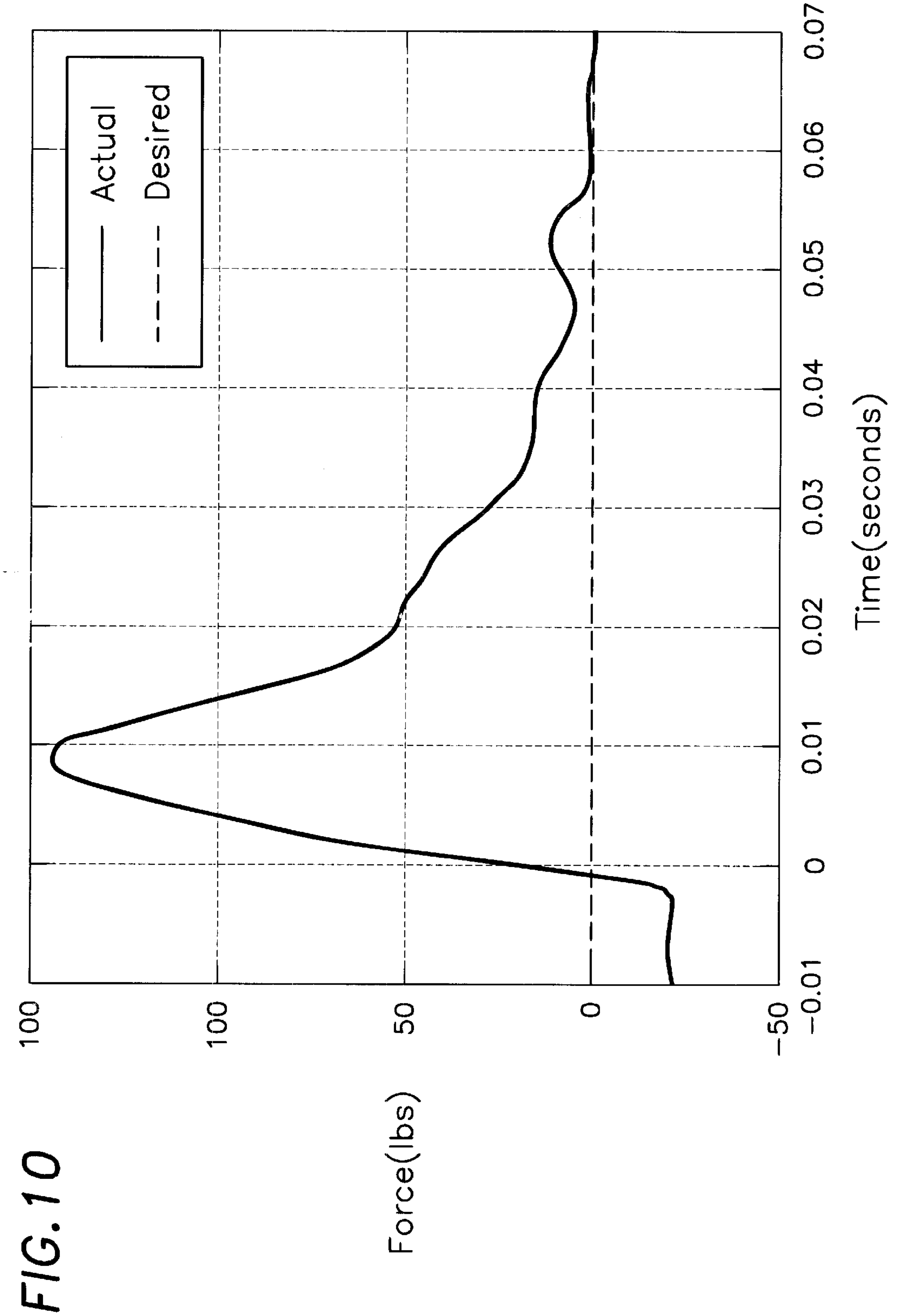
FIG. 10 is a plot of drop test impulse response of an experimental hydro-elastic actuator built in accordance with the invention.

It was found that the physical elasticity of the actuator invested the actuator with a significant shock load tolerance. Specifically, the springs of the system were found to maintain mechanical stability during a physical impact and spread out the impulse of the impact over time. This is in important advantage for minimizing the peak power of a mechanical impact. To test the shock tolerance of the experimental actuator, the actuator was vertically suspended, such that the load mass was suspended at the top of the actuator push rod stroke with a force equal to the gravity pull on the load mass. The input desired force was then set to zero such that the push rod dropped to the bottom of its stroke, exerting a sharp impulse load on the actuator. FIG. 10 is a plot of the actuator response to this impulse load. As shown in the plot, the impulse is spread out over about 40 msec. The impulse is defined as the area under the curve, found to be about 12 kg m/s. This spreading of the impulse over time is particularly advantageous in that it provides time for the control system to react to the impulse and adjust the force generated by the actuator, thereby minimizing the damage to the actuator and/or the load due to high peak impact forces, in a manner not fully achievable without the elastic element.

As evidenced by the various performance measures described above, the hydro-elastic actuator of the invention provides the ability to make a high-fidelity measurement of the output force of a hydraulic system without measuring pressure or flow characteristics of the hydraulic system. The feedback control loop enables precise hydraulic system force control to a level not previously achievable without complicated control schemes to accommodate hydraulic characteristics. The high power and high force generation capabilities of the hydraulic actuator are preserved while providing shock tolerance, precise force control, and good force control stability. It is recognized, of course, that those skilled in the art may make various modifications and additions to the hydro-elastic actuator described above without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. A force-controlled hydro-elastic actuator comprising:

a hydraulic actuator having a connection to hydraulic fluid and including a mechanical displacement member positioned to be mechanically displaced by fluid flow at the actuator;

a valve connected at the hydraulic actuator connection and having a port for input and output of fluid to and from the valve;

at least one elastic element provided in series with the mechanical displacement member of the hydraulic actuator and positioned to deliver, to a load, force generated by the hydraulic actuator;

a transducer positioned to measure a physical parameter indicative of the force delivered by the elastic element and to generate a corresponding transducer signal; and a force controller connected to accept an input indicative of a desired actuator output force to be delivered to the load, the force controller being further connected between the transducer and the valve to control the valve based on the transducer signal and the input, for correspondingly actuating the hydraulic actuator, by an amount that delivers to the load the desired actuator output force, and deflecting the elastic element.

2. The hydro-elastic actuator of claim 1 wherein the transducer signal is based on deflection of the elastic element.

3. The hydro-elastic actuator of claim 1 wherein the hydraulic actuator comprises a hydraulic actuation chamber in which the mechanical displacement member is disposed with respect to the fluid connection, comprising a fluid inlet and a fluid outlet of the chamber for control of displacement of the displacement member by fluid flow into and out of the chamber.

4. The hydro-elastic actuator of claim 3 wherein the valve is connected to the fluid inlet and fluid outlet of the actuator chamber.

5. The hydro-elastic actuator of claim 4 wherein the valve comprises a flow control valve.

6. The hydro-elastic actuator of claim 5 wherein the force controller produces a valve control signal comprising an electrical current, directed to the valve, indicative of a controlled fluid flow to be produced through the valve.

7. The hydro-elastic actuator of claim 6 wherein the valve control signal comprises an electrical current indicative of a controlled bi-state valve operation between a state of zero fluid flow and a state of maximum fluid flow.

8. The hydro-elastic actuator of claim 7 wherein the force controller further produces a fluid source control signal directed to a fluid source connected to the valve port, the fluid source control signal indicating a controlled pulsed delivery of fluid to the valve in synchrony with the controlled bi-state valve operation.

9. The hydro-elastic actuator of claim 6 wherein the valve control signal is based on proportional control of actuator output force.

10. The hydro-elastic actuator of claim 6 wherein the valve control signal is based on proportional-integral control of actuator output force.

11. The hydro-elastic actuator of claim 4 wherein the connection between the valve and the actuator chamber fluid inlet and fluid outlet is dimensionally fixed.

12. The hydro-elastic actuator of claim 3 wherein the hydraulic actuation chamber comprises a linear piston chamber and wherein the displacement member of the chamber comprises a linear piston and a piston push rod extending out of the chamber.

13. The hydro-elastic actuator of claim 12 wherein the piston comprises a double-acting piston.

14. The hydro-elastic actuator of claim 12 wherein the hydraulic actuation chamber comprises a substantially non-leaky seal at a location where the piston push rod extends out of the chamber.

15. The hydro-elastic actuator of claim 12 wherein the hydraulic actuation chamber comprises at least one leaky seal and at least one leakage scavenger seal at a location where the piston push rod extends out of the chamber.

16. The hydro-elastic actuator of claim 12 wherein the piston comprises a single-acting piston.

17. The hydro-elastic actuator of claim 3 wherein the hydraulic actuation chamber comprises a rotary piston chamber and wherein the displacement member of the chamber comprises a rotary vane and a rotary shaft extending out of the chamber.

18. The hydro-elastic actuator of claim 1 wherein the elastic element comprises a nonlinear elastic element.

19. The hydro-elastic actuator of claim 1 wherein the elastic element comprises at least one spring disposed in series with the hydraulic actuator displacement member.

20. The hydro-elastic actuator of claim 1 wherein the elastic element comprises a plurality of springs positioned to together result in an elasticity provided in series with the hydraulic actuator displacement member.

21. The hydro-elastic actuator of claim 1 further comprising at least one coupling element provided in series with and between the elastic element and the hydraulic actuator displacement member.

22. The hydro-elastic actuator of claim 1 further comprising an output element provided in series with and between the elastic element and the load.

23. The hydro-elastic actuator of claim 1 wherein the transducer comprises a potentiometer.

24. The hydro-elastic actuator of claim 1 wherein the transducer comprises a strain gauge.

25. The hydro-elastic actuator of claim 1 wherein the transducer comprises a magnetic position sensor.

26. The hydro-elastic actuator of claim 1 wherein the transducer comprises an optical position sensor.

27. The hydro-elastic actuator of claim 1 wherein the valve port includes a connection for receiving fluid pumped by a fluidic pump.

28. The hydro-elastic actuator of claim 1 wherein the elastic element comprises a linear elastic element.

* * * * *